United States Patent [19]

Bruno

[11] Patent Number: 5,019,737
[45] Date of Patent: May 28, 1991

[54] TWIN-WALLED CASING FOR ELECTRIC MOTOR WITH FORCED AIR-COOLING

[75] Inventor: Caoduro Bruno, Vincenza, Italy

[73] Assignee: Nowax S.r.l., Vicenza, Italy

[21] Appl. No.: 459,380

[22] Filed: Dec. 29, 1989

Related U.S. Application Data

[63] Continuation-in-part of Ser. No. 310,676, Feb. 14, 1989, abandoned.

[30] Foreign Application Priority Data

Jul. 26, 1988 [IT] Italy ............................... 85621 A/88

[51] Int. Cl.⁵ .......................... H02K 5/04; H02K 5/18; H02K 5/20/9/16
[52] U.S. Cl. ....................................... 310/89; 310/52; 310/58; 310/63
[58] Field of Search ...................... 310/52, 60 A, 60 R, 310/62, 63, 58, 89

[56] References Cited

U.S. PATENT DOCUMENTS

| | | | |
|---|---|---|---|
| 1,360,483 | 11/1920 | Wiard | 310/62 |
| 1,803,570 | 5/1931 | Uggla | 310/62 |
| 2,716,195 | 8/1955 | Anderson | 310/63 |
| 3,047,753 | 7/1962 | Westell | 310/89 |
| 3,143,284 | 8/1964 | Lindsjo et al. | 310/91 |
| 3,445,696 | 5/1969 | Erickson | 310/62 |
| 3,643,119 | 2/1972 | Lukens | 310/60 |
| 3,916,231 | 10/1975 | Cathey | 310/89 |
| 4,465,946 | 8/1984 | Springer | 310/89 |
| 4,680,493 | 7/1987 | Ziegler et al. | 310/89 |
| 4,684,835 | 8/1987 | Kline, Jr. et al. | 310/89 |

*Primary Examiner*—Steven L. Stephan
*Assistant Examiner*—C. LaBallo
*Attorney, Agent, or Firm*—Wenderoth, Lind & Ponack

[57] ABSTRACT

An electric motor casing with forced air cooling comprising an outer cylindrical jacket and an inner cylindrical jacket arranged coaxially and radially spaced to form an annular chamber which is open at end sections thereof. The outer jacket and the inner jacket are mutually connected by a plurality of substantially radial ribs, angularly spaced from one another to define, within said annular chamber, a plurality of flow channels for the cooling air, the inner walls of these channels being adapted to make the air flow substantially laminar.

5 Claims, 2 Drawing Sheets

TWIN-WALLED CASING FOR ELECTRIC MOTOR WITH FORCED AIR-COOLING

This application is a continuation-in-part of now abandoned application, Ser. No. 07/310,676 filed on Feb. 14,1989.

BACKGROUND OF THE INVENTION

The present invention relates to an electric motor casing with forced air cooling.

It has been long known to manufacture the casings or shells of electric motors using two coaxial cylindrical jackets mutually connected at the end thereof by the motor head plates, in order to produce a cylindrical chamber through which air flows, impelled by a fan mounted on the motor shaft proximate to one of the head plates, said air escaping through holes on the other of the head plates.

Several disadvantages of these known casings are related to the fact that the airflow is rather turbulent inside the interspace defined by the two jackets as there is no appropriate means for conveying said flow, thus reducing the efficiency of the cooling and furthermore causing considerable noise.

The assembly costs of this type of casing are furthermore notably high and detrimental to the production costs of the entire motor.

It is an aim of the present invention to provide a motor casing which eliminates the above mentioned disadvantages, improves the operating characteristics of the unit and requires simplified assembly operations in order to reduce the corresponding production costs.

Within the scope of the above described aim, it is a particular object of the present invention to provide a motor casing whose assembly requires no tedious and time-waisting operation normally needed for centering the double jacket before mounting the end head plates.

A further object of the present invention is to make the flow of cooling air within the interspace between the two jackets more regular and uniform, rendering it substantially laminar, so as to generally improve the cooling of the motor and increase its overall efficiency while reducing the operating noise.

BRIEF SUMMARY OF THE INVENTION

This aim, as well as these and other objects which will become apparent hereinafter, are achieved by a double-jacket electric motor casing with forced air cooling, comprising an outer cylindrical jacket and an inner cylindrical jacket, arranged coaxially and radially spaced to define an annular interspace opened at the end sections thereof, said inner cylindrical jacket being arranged to internally accommodate a stator pack, wherein a plurality of substantially radial and angularly spaced connecting ribs are arranged between said inner and outer cylindrical jackets so as to define, inside said annular interspace, a plurality of flow channels providing a substantially laminar flow for the cooling air.

Further characteristics and advantages of the invention will become apparent from the description of some preferred but not exclusive embodiments of the casing according to the invention, illustrated only by way of non-limitative example in the accompanying drawings, wherein.

Figure 1:
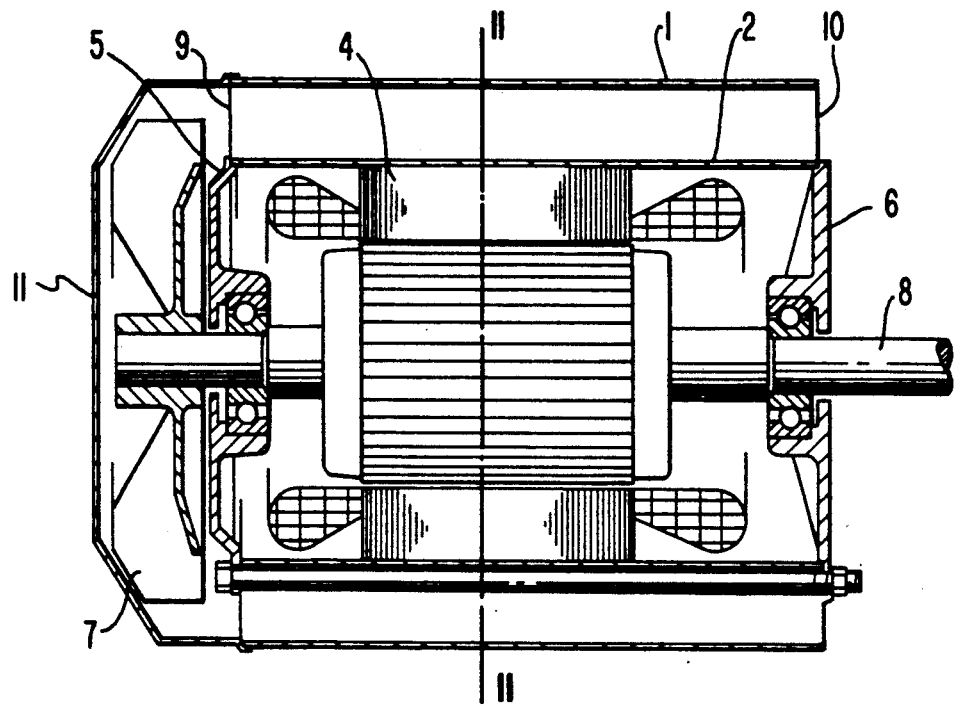
FIG. 1 is a longitudinal sectional view of a motor comprising the casing according to the invention.
Figure 2:
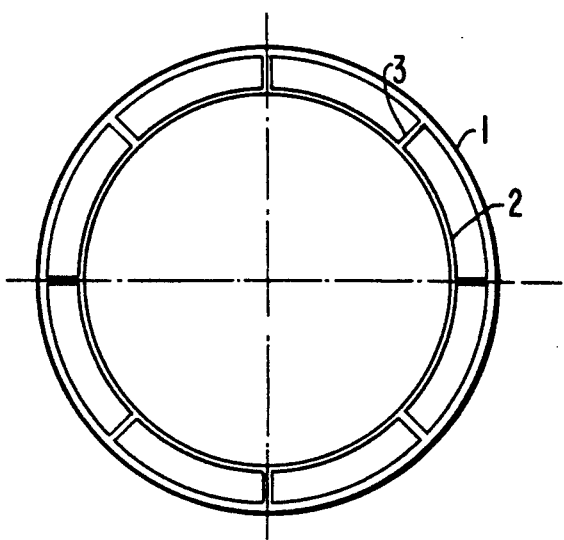
FIG. 2 is a transverse sectional view, taken along the line II—II, of the casing illustrated in FIG. 1 in a first preferred embodiment.

With reference to FIG. 1, the casing of the motor is constituted by a pair of coaxial cylindrical jackets 1 and 2 mutually connected by a plurality of radial walls 3, whose number and shape may be appropriately choosen in accordance with the type of motor, so as to form a substantially unitary body wherein the stator pack 4 is inserted, the head plate 5 and 6 of the motor being mounted at the opposite end sections of said body.

A fan 7 is keyed on the motor shaft 8 so as to force air lengthwise through the interspace enclosed by the two cylindrical jackets 1 and 2 between the annular end openings 9 and 10. Expediently, the fan 7 may be of the axial or partially axial type which affords particularly brilliant operating characteristics and significantly improves the motor's reliability when combined with the motor casing according to the invention. A fan-covering collector dome (11) is mounted to the casing over the fan to enclose the fan.

The radial connecting ribs 3 arranged between the two coaxial jackets 1 and 2 have substantially continuous and smooth walls so as to provide a substantially laminar flow of the cooling air thus improving the effectiveness of the motor and reducing the loudness thereof.

The enbloc arrangement of the two jackets 1 and 2 with the related radial ribs 3 simplifies the motor assembly operations and consequently reduces production costs.

The ribs 3 which connect the inner jacket 2 with the outer jacket 1 furthermore transfer heat by conduction from the inner jacket to the outer jacket, consequently improving efficiency in cooling.

In a first preferred embodiment, the motor casing is made of aluminum, for instance shaped by an extrusion process, though die-casting may also be applied, regardless of the type of alloys employed.

In particular, it is possible to provide a plurality of die-cast sections each defining a separate channel, these sections being mechanically coupled to one another to construct the whole casing.

Figure 3:
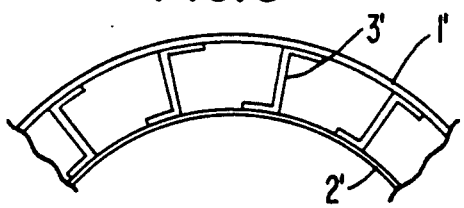
FIG. 3 is a view of a transverse sectional portion of the casing of FIG. 1, taken along the line II—II, in a second preferred embodiment.

In a second preferred embodiment, exemplary illustrated in FIG. 3, the motor casing according to the invention can be entirely made of metal sheet be separately forming the two jackets 1' and 2' and then connecting them with a plurality of cold or hot died profiled elements 3'. These elements 3' have a substantially Z-shaped cross section, which defines radial portions and opposed wing portions, these latter being connected to the facing surfaces of the two coaxial jackets by continuous or spot welding.

Figure 6:
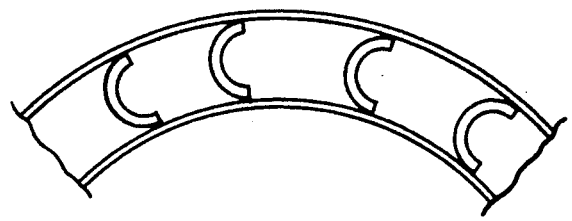
FIG. 6 is a view of a transverse sectional portion of the casing of FIG. 1, taken along the line II—II in a fifth preferred embodiment.

The transverse cross section of the profiled elements 3' may be different from the Z-like shape, for example it may be C-shaped, as illustrated in FIG. 6, without substantially changing the final shape of the assembled casing.

Figure 4:
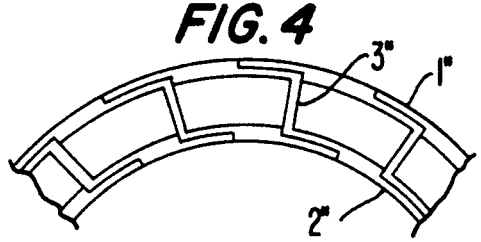
FIG. 4 is a view of a transverse sectional portion of the casing of FIG. 1, taken along the line II—II, in a third preferred embodiment.

In a third preferred embodiment, the cylindrical surfaces of the two jackets 1, 2 may be defined by the wings themselves of the profiled elements 3″, as illustrated schematically in FIG. 4. To this end, each profiled element 3″ has substantially Z-shaped transverse cross sections with upper and lower wings, these wings having along the edges thereof longitudinal protrusions engageable with complementary shaped grooves formed in the adjacent profiled element to define the substantially continuous cylindrical walls of the jackets 1″ and 2″.

Figure 5:
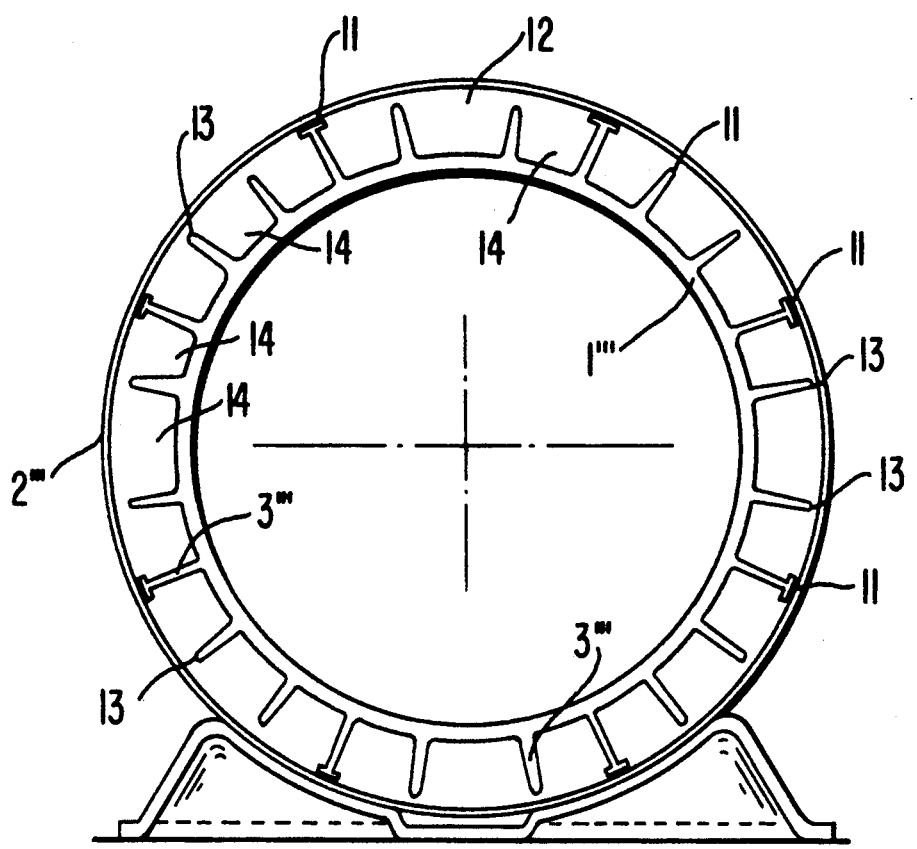
FIG. 5 is a transverse sectional view of the casing of FIG. 1 taken along the line II—II, in a fourth embodiment.

In the embodiment of FIG. 5 the longitudinal ribs 3′″ are radial projections distributed over the entire circumference in a substantially regular fashion. The projections stem from the inner jacket 2′″ and are smoothly joined with its outer surface to define an integral core body which may be obtained by an extruded aluminum profile or by any equivalent manufacturing process.

The outer jacket 1′″ consists of a tubular member, e.g. of welded sheet metal, having a suitable dimesion to entirely enclose the extruded core body as above. In the illustrated embodiment of FIG. 5, part of the radial ribs 3′″ have longitudinal tip edges 11 which are in contact engagement with the internal surface of the outer jacket 1′″ as this latter is slightly forced over the extruded integral core, thus defining a plurality of separate main flow channels 12.

The remaining radial ribs 3′″ located within the main channels 12 have longitudinal free edges 13 inwardly spaced from the internal surface of the outer jacket 1′″ by a predetermined clearance so as to form for example three intercommunicating sub-channels 14 for each main channel 12. The passage between the adjacent sub-channels allow a laminar air passage providing uniform air flow internally of each main channel.

In practice it has been observed that the above described casing fully achieves the intended aim of the present invention, since the assembly operations of the entire motor are enormously simplified and consequently reduce production costs. The casing according to the invention furthermore provides a substantially laminar cooling air flow, reducing the noise produced by the unit and increasing the overall efficiency of the motor.

The casing thus conceived in susceptible to numerous modifications and variations all comprised within the scope of the inventive concept as defined in the accompanying claims; all the details may furthermore be replaced by technically equivalent elements.

In practice, the materials employed, so long as compatible with the specified use, as well as the shapes and dimensions, may be varied according to the requirements and to the state of the are.

What is claimed is:

1. A double-jacketed electric motor casing with forced air cooling, comprising:
   an outer cylindrical jacket and an inner cylindrical jacket arranged coaxially and mutually spaced to define therebetween an annular interspace having open end sections thereof, said inner cylindrical jacket being arranged to internally accomodate a stator pack,
   a fan-covering collector dome mounted proximate to one of said open end sections, and
   a plurality of connecting ribs arranged between said outer and inner cylindrical jackets, said connecting ribs extending in a substantially radial direction and being angularly spaced to define inside said annular interspace a plurality of flow channels providing a substantially laminar flow for the cooling air,
   wherein said outer and inner jackets are formed from a plurality of elongate separate elements made of stamped metal sheet, said elements having a transverse cross-section substantially Z-shaped to define in said connecting ribs a central portion connecting opposed end wings, said elements being mutually welded by substantially continuous welding along said wings thereof.

2. A double-jacketed electric motor casing with forced air cooling, comprising:
   an outer cylindrical jacket and an inner cylindrical jacket arranged coaxially and mutually spaced to define therebetween an annular interspce having open end sections thereof, said inner cylindrical jacket being arranged to internally accomodate a stator pack,
   a fan-covering collector dome mounted proximate to one of said open end sections, and
   a plurality of connecting ribs arranged between said outer and inner cylindrical jackets, said connecting ribs extending in a substantially radial direction and being angularly spaced to define inside said annular interspace a plurality of flow channels providing a substantially laminar flow for the cooling air,
   wherein said connecting ribs comprise a plurality of elongate profiled elements made of stamped metal sheet, said elements defining in transverse cross-section a central portion connecting opposed end wings, each wing having a longitudinal edge adapted for engagement with a complementary shaped groove formed in an adjacent element, the wings of said adjacent elements being mutually welded together along said edges and complementary shaped grooves engaging with each other so as to define said outer and inner cylindrical jackets.

3. A double-jacketed electric motor casing with forced ventilation, comprising: a cylindrical outer jacket and cylindrical inner jacket arranged coaxially and mutually radially spaced to define therebetween a toroidal interspace, said toroidal interspace having annular open end sections defining respectively an air inlet opening and an air discharge opening, said outer and said inner jackets extending continuously between said air inlet opening and said air discharge opening,
   head cover plates arranged at opposed ends of said inner jacket to define a closed chamber within said inner jacket,
   a stator pack located within said closed chamber,
   a fan-covering collector dome mounted proximate to said air inlet opening for selectively directing the air flow into the toroidal interspace external to said closed chamber, and
   a plurality of elongate radial ribs extending axially in said toroidal interspace at angularly spaced locations thereof which form axially extending channels providing a unidirectional and substantially laminar air flow between said air inlet opening and said air discharge opening,
   wherein said plurality of ribs are elongate projections extending outwardly from said inner jacket and continuously connected therewith to form a unitary body obtained from an extruded aluminium profile, said outer jacket being a sheet metal tubular frame, said plurality of ribs comprising a first series of angularly spaced ribs and a second series of ribs interposed between said first series of ribs, said first series of ribs having longitudinal tip edges arranged for forced engagement along the entire length of said tip edges with said outer jacket to provide a rigid connection between said inner and said outer jackets said second series of ribs having a smaller radial extension than said first series of ribs and being spaced apart from said outer jacket, whereby upon assembly of said double-jacketed electric motor casing by forced sliding of said outer jacket on said inner jacket, said outer jacket is adapted to undergo a slight inward deformation in the portions of the outer jacket between said longitudinal tip edges of said first series of ribs, thereby reducing frictional forces and allowing larger coupling tolerances between said jackets.

4. A double-jacketed electric motor casing according to claim 3, wherein said first series of ribs are angularly spaced substantially evenly apart to form a plurality of separate air flow channels, and said second series of ribs are regularly spaced between said first series of ribs and have longitudinal free edges which are radially spaced apart from said outer jacket, wherein said second series of ribs increase the heat transmitting surface of said inner jacket and define in each separate air flow channel a plurality of intercommunication sub-channels adapted to optimize heat dissipation by convection.

5. A double-jacketed electric motor casing with forced ventilation, comprising:
 a cylindrical outer jacket and a cylindrical inner jacket arranged coaxially and radially, said outer and inner jackets mutually spaced to define therebetween a toroidal interspace, said toroidal interspace having annular open end sections defining an air inlet opening and an air discharge opening respectively, wherein said outer and inner jackets extend continuously between said air inlet opening and said air discharge opening,
 a plurality of radially extending connecting ribs arranged in an axial direction internally of said toroidal interspace at angularly spaced locations for connecting said outer and inner jackets in radially spaced relationship to allow air passage therebetween, said connecting ribs being imperforate elongate elements defining internally of said toroidal interspace a plurality of separte air flow channels extending in the axial direction so as to provide a unidirectional and substantially laminar air flow between said air inlet opening and said air discharge opening,
 head cover plates arranged at opposite ends of said inner jacket to define a closed chamber within said inner jacket,
 a stator pack located within said closed chamber, and
 a fan-covering collector dome mounted proximate to said air inlet opening for directing the flow of air into the toroidal interspace external to said closed chamber,
 wherein said connecting ribs are metal sheet stamped elongate elements, said elongate elements shaped in transverse cross-section to define a central radial portion and opposed end wings substantially parallel to said inner and outer jackets, said inner and outer jackets having cylindrical walls internally of said toroidal space, and
 wherein said elongate elements are substantially Z-shaped in transverse cross-section, the wings of each element arranged for overlapping engagement with complementary shaped grooves formed in an adjacent elongate element so as to define the cylindrical walls of said inner and outer jackets.

* * * * *